United States Patent

White et al.

[15] 3,692,864

[45] Sept. 19, 1972

[54] HYDROGENATION PROCESS UTILIZING HOMOGENEOUS METAL CATALYSTS

[72] Inventors: Rudolph C. White, Midlothian; Judith G. Thatcher, Richmond, both of Va.

[73] Assignee: Texaco Inc., New York, N.Y.

[22] Filed: Sept. 30, 1970

[21] Appl. No.: 76,991

[52] U.S. Cl. ............ 260/683.9, 208/143, 252/431 P, 260/439 R
[51] Int. Cl. .................................................. C07c 5/02
[58] Field of Search........260/683.9, 439 R; 208/143; 252/431 P

[56] References Cited

UNITED STATES PATENTS

| | | | |
|---|---|---|---|
| 3,488,400 | 1/1970 | Candlin et al. | 260/677 |
| 3,102,899 | 9/1963 | Cannell | 260/429 R |
| 3,110,747 | 11/1963 | Mullineaux | 260/683.9 |
| 3,270,087 | 8/1966 | Heck | 260/683.9 |

*Primary Examiner*—Delbert E. Gantz
*Assistant Examiner*—A. P. Demers
*Attorney*—Thomas H. Whaley and Carl G. Reis

[57] ABSTRACT

This invention relates to processes for hydrogenating unsaturated organic molecules such as olefins and dienes to their saturated derivatives utilizing homogeneous metal complexes of the iron triad type as catalytic agent.

11 Claims, No Drawings

HYDROGENATION PROCESS UTILIZING HOMOGENEOUS METAL CATALYSTS

This invention concerns process for hydrogenating unsaturated organic molecules to their saturated derivatives using homogeneous metal complexes as the catalytic agents.

More particularly, this invention relates to processes for hydrogenating unsaturates such as olefins and dienes, with homogeneous metal complexes of the iron triad type as catalytic agents.

BACKGROUND OF THE INVENTION

Until comparatively recently heterogeneous catalysts have mainly been used in the conversion of unsaturated organic molecules to their hydrogenated derivatives. Typical of these catalysts are finely divided colloidal solids such as activated nickel, platinum, palladium and the like. These catalysts, in contrast to homogeneous catalysts, form phases separate from reactants and products and are usually insoluble in the reaction mixture. One of the characteristics which most heterogeneous catalysts share in common is a microporous structure and a very large internal surface area which can, in some instances, approach 1,000 $M^2/g$ or more. Possibly because of the large surface areas involved, these catalysts are rather readily inactivated by diverse substances commonly known in the art as poisons. In view of this propensity, many heterogeneous catalysts suffer from the need for frequent replenishment and if economically feasible for low cost processes of regeneration. Other shortcomings of heterogeneous catalysts are they usually require the use of rather elevated reaction temperatures and reaction pressures, and that they have relatively poor selectivity.

By selectivity, as defined herein, is meant the efficiency in catalyzing a desired transformation relative to other undesired reactions. Selectivity is usually expressed by a factor representing the amount of desired product formed, divided by the amount of charge destroyed. Inasmuch as low selectivity and poisoning are costly by-products of heterogeneous catalysts, improved catalytic processes which avoid these problems are continually being sought.

Recently, the applicants have found that certain homogeneous metal complexes are effective in the hydrogenation of unsaturated organic molecules to their saturated derivatives. These catalysts in which the metal components are selected from the iron triad group are believed to be novel as hydrogenation catalysts, especially in the hydrogenation of olefins and dienes to their saturated products. Not only do these catalysts exhibit a high degree of selectivity, but they are resistant to loss of activity through poisoning and most important are capable of achieving high conversions usually within an hour or two of hydrogenation.

The homogeneous catalysts of this invention are employed by the process described below:

In practice, unsaturated organic substrates to be hydrogenated are contacted with a catalytic quantity of at least one homogeneous metal complex catalyst of the cobalt-nickel-iron triad type, in a non-aqueous environment at temperatures below 50° C., at pressures ranging from 0 psig to about 600 psig and higher in the presence of hydrogen, in the substantial absence of an oxidizing atmosphere, until the desired hydrogenation of unsaturated organic molecule takes place. The converted products are separated from the reaction mixture by the usual manipulative techniques used in organic synthesis, such as filtration, extraction, distillation or any combination or sequence thereof.

In the favored practice, each mole of unsaturated hydrocarbon substrate to be hydrogenated is contacted with from about 0.01 to 0.1 mole of one or more of the catalyst complexes to be described infra wherein the triad metal is cobalt, in a non-aqueous medium provided by a solvating quantity of inert non-aqueous solvents, at elevated temperatures ranging from about 30° to 45° C., at pressures ranging from 0 to about 600 psig, in the presence of a gaseous environment provided by hydrogen, until said substrate is converted to the desired hydrogenated derivative, and separating said hydrogenated derivative contained therein as described above.

In the preferred practice, each mole of hydrocarbon olefin or diene substrate to be hydrogenated is:

a. contacted in a hydrogen atmosphere, in an environment substantially free from oxygen, water and carbon monoxide, with from about 0.05 to 0.1 mole of a homogeneous cobalt complex believed to have the composition:

wherein X is a halogen selected from chlorine, bromine and their mixtures, Ph is a radical selected from the group consisting of phenyl, alkylated phenyl and their mixtures, with a solvating quantity of inert solvent, substantially free from water and dissolved oxygen to form a reaction mixture.

b. heating said reaction mixture between about 35° to 40° C., c. pressurizing said reaction mixture with hydrogen at pressures ranging up to 600 psig and higher while continuing heating the reaction mixtures, until the desired hydrogenation of the diene or olefin takes place, and d. isolating said hydrogenated products contained therein.

In order to aid in the understanding of this invention the following additional disclosure is submitted:

A. UNSATURATED ORGANIC SUBSTRATE

As defined herein the substrates of this invention are those containing one or more double and/or triple bonds from one carbon atom to another, or from one carbon multibonded to an oxygen, sulfur or nitrogen atom. Where the unsaturation is from one carbon atom to another, the substrate compounds can include olefins, dienes, trienes as well as one or more acetylenic linkages. Illustrative unsaturated substrates include allyl alcohol, methallyl alcohol, isopropenylbenzene, styrene, vinyl cyclohexene, cycloheptene, cyclooctene. The favored substrates include aliphatic olefins such as the alpha-olefins and dienes. The former include ethylene, propylene, butene-1, pentene-1, hexene-1, heptene-1, octene-1 and their higher homologs, either in the form of single discrete compounds or mixtures of these compounds. Illustrative of the dienes which can be employed are linear dienes such as butadienes, pentadienes and octadienes as well as their higher homologs. Cyclic dienes such as cyclopentadienes, cyclohexadienes and cyclooctadienes are also illustrative of substrates which lend themselves to hydrogenation. The unsaturated substrates can contain substantial quantities of solvents inert to hydrogenation. These are illustrated by the alkyl ethers and aromatics.

B. HOMOGENEOUS METAL COMPLEX CATALYST OF THE COBALT-NICKEL-IRON TRIAD-TYPE:

These catalysts are included within the structure:

$$MX(Ph_3Z)_3$$

wherein M is a metal selected from the triad consisting of cobalt, iron, nickel and their mixtures, Ph is an organic radical selected from the group consisting of phenoxy ($C_6H_5O$), alkylated phenoxy, phenyl and alkylated phenyl radicals, wherein said alkylating radicals can contain from one to six carbon atoms, X is a halogen selected from chlorine, bromine, iodine and their mixtures and Z is a non-metallic element selected from the group consisting of phosphorus, arsenic, antimony and their mixtures. The catalysts of this invention are known compounds whose preparation is typified by the 2-step process used to prepare the cobalt chloro analog

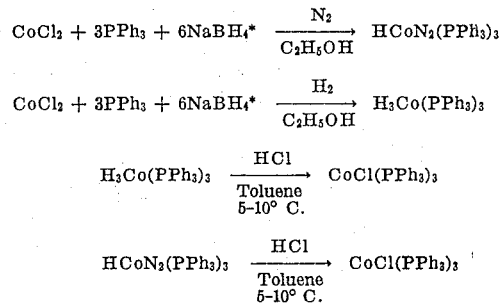

*Alternatively, 1 mole of triisobutyl aluminum, (iso-$C_4H_9$)$_3$Al, can be employed with cobalt acetylacetonate in the place of the sodium borohydride used with cobalt chloride.

wherein Ph is a radical selected from the group consisting of phenyl, phenoxy, alkylated phenyl and mixtures thereof. The bromo and iodo derivatives may be prepared analogously.

Chlorotris(triphenylphosphine)cobalt(I) is an air-sensitive green colored complex which has moderately good solubility in non-polar solvents such as benzene, toluene, xylene and mixtures of these solvents.

Illustrative homogeneous catalyst complexes include the following among others: CoCl[$(C_6H_4—CH_3)_3P]_3$, CoCl[$(C_6H_4—CH_3)_3As]_3$, CoCl[$(C_6H_3—(CH_3)_2)_3P]_3$, CoCl[$(C_6H_4—C_4H_9)_3P]_3$, CoCl[$(C_6H_4—C_3H_7)_3Sb]_3$, CoBr[$(C_6H_5)_3—P]_3$, CoBr[$(C_6H_4—CH_3)_3P]_3$, as well as the corresponding complexes wherein nickel or ion are substituted for cobalt in the complex.

C. HYDROGEN ATMOSPHERE

Insofar as can be determined, consistently high conversions of unsaturated organic molecules to their hydrogenated derivatives are obtained only with an atmosphere that is substantially hydrogen. To avoid significant formation of undesired carbonyl-containing products such as aldehydes and ketones, the hydrogen gas must be substantially free of carbon monoxide. Similarly, to minimize sensitivity of the complexes to the oxygen, the reactants and solvents must be substantially free from oxygen.

Ordinarily the reactor employed is first evacuated and then filled with hydrogen. The solvent employed is then added to the reactor and then the reactor is again flushed with hydrogen, usually for a period ranging from about 15 to 30 minutes. While the reactor is being flushed with hydrogen, the catalyst complex is added and rapidly dissolves in the rapidly agitated solution. The unsaturated substrate as embodied by olefins is then added to the reactor. After withdrawing any samples required for analysis, the reactor is heated to the desired temperature and pressurized to the desired pressure with hydrogen. The heating of the agitated mixture is continued (with periodic sampling if desired) until the desired conversion is obtained. Elemental analysis, infra-red, gas chromatography and nuclear magnetic resonance are among the analytical methods used to determine the products prepared.

D. REACTION CONDITIONS

1. Heating — The CoCl(PPh$_3$)$_3$ complex decomposes in inert atmosphere at about 90° C., and under an atmosphere of N$_2$ or H$_2$ in solution at about 45°–50° C. Because of this thermal instability, hydrogenations must be run at lower temperatures. Good activity in hydrogenation is obtained between about 30° C. and 40° C., with the best yields being obtained between about 35° C. and 40° C. In view of this, the latter heating range is preferred. Again, because of the sensitivity of the complexes to oxygen and moisture, the storage and utilization of the complexes must take place under hydrogen or inert gases such as nitrogen, argon and the like, or their mixtures.

2. Reaction Pressures — Reaction pressures from about atmospheric to superatmospheric can be employed dependent upon the activity of the metal complex, the reaction temperatures used and the type of unsaturated molecule used as substrate. In the hydrogenation of olefins wherein the preferred cobalt complex, CoCl(Ph$_3$P)$_3$ is employed, hydrogen pressures ranging from about 1 to 600 psig and higher can be used. In the reduction of mono-olefins and diolefins with the above cobalt chloro complex, rapid conversions are obtained between 300 to 600 psig at reaction temperatures ranging from 35° to 40° C. and this represents the preferred temperature and pressure conditions. The decreasing ease of reduction for the olefins is as follows:

Alpha olefins, conjugated cyclic and conjugated straight chain diolefins, non-conjugated cyclic diolefins, cis olefins, trans olefins.

3. Reaction Times — The reaction times required for substantial reduction of unsaturated organic molecules is a variable dependent upon the unsaturated substrate to be converted, the catalyst used, the batch size and the like. When CoCl[Ph$_3$P]$_3$ is used as the catalyst complex to hydrogenate alpha olefins at temperatures ranging from 35° to 40° C. and at pressures ranging from about 200 psig to 1,000+ psig, the hydrogenation is usually complete within several hours, most often within ½ to 1 hour. Internal and branched mono-olefins and non-conjugated dienes are reduced more slowly.

4. Mole Ratio of the Catalytic Complex to the Olefin — the mole ratio of catalyst to olefin substrate is not particularly critical and may be varied in order to achieve a homogeneous solution. In general, larger mole ratios of catalyst complex will produce a faster rate of hydrogenation. Molar ratios of the preferred cobalt complex to alpha olefins ranging between 1:10 and 1:100 will normally suffice and are referred to as a "catalytic quantity." The best results are obtained at the mole ratios of 1:10.

5. Solvents — Solvents, while not required generally, facilitate the ease of handling and therefore are usually employed. When solvents are utilized they are usually present in quantities sufficient to dissolve the catalyst and unsaturated substrates. Aromatics such as benzene, toluene, xylene and mixtures of these solvents are the most useful solvents.

Having described the inventive process in general terms, the following embodiments and examples are submitted as specific illustration of the inventive concepts. Unless otherwise specified, all parts and percentages are by weight rather than by volume.

EMBODIMENT A — PREPARATION OF $HCoN_2(PPh_3)_3$

A 10-gram portion (28 mM) of cobalt acetylacetonate [$Co(C_5H_7O_2)_3$] and 30 grams (114 mM) of triphenylphosphine are added to 200 ml of stirred toluene contained in an appropriately sized reaction vessel fitted with heating, cooling and stirring means, and capable of being flushed by a stream of gas. The stirred solution is continuously flushed for 15 minutes with a stream of nitrogen under one atmosphere of pressure. The solution is cooled to about 10° C. and 5.54 grams of triisobutyl aluminum (28 mM) contained in 11 ml of toluene solution is slowly added to the stirred, dark green reaction mixture. The solution is then warmed up to 25° C., at which time it turns dark orange-red. The reaction mixture is then concentrated to about one-tenth its original volume under vacuum and 200 ml of n-pentane is added to precipitate bright orange crystals. These crystals are removed and washed several times with additional n-pentane and dried overnight under vacuum and stored under vacuum. The orange crystalline solid has an m.p. of 80° C. (with decomposition) and is sensitive to and decomposes in contact with oxygen. The infra-red spectrum and nuclear magnetic resonance establish that the product is the expected $HCoN_2(PPh_3)_3$.

A five gram portion (5.7 mM) of $HCoN_2(PPh_3)_3$ prepared as described in Embodiment A, is added to 100 ml of toluene in a reaction vessel fitted with heating, cooling and agitation means and capable of being flushed with a gas. During all of the additions a continuous flow of nitrogen is used to minimize contact of the reactants and product with the oxygen of the air. The reaction medium is cooled to 5° to 10° C. and 12 ml of ethanol solution containing 5.7 mM HCl is slowly added to the agitated solution. After a short time, gas evolution begins (nitrogen and hydrogen) and the reaction solution which is dark red, becomes green, and a large amount of a yellow-green precipitate drops out of solution. The yellow-green product is separated, washed with pentane and upon analysis is found to the crystals of the desired product. More of the desired complex precipitated out from the mother liquor is separated, washed with n-pentane, combined with the first crop of crystals and the combined crop is dried overnight under vacuum and stored under nitrogen. The infra-red spectrum of the complex shows only cobalt-$PPh_3$ bands, and these data coupled with elemental analysis, confirm that the product is the desired complex.

EXAMPLE 1

HYDROGENATION OF AN OLEFINIC SUBSTRATE USING $CoCl(Ph_3P)_3$ AS CATALYST

An appropriately sized reactor fitted for heating, cooling and agitation means and capable of being pressurized is evacuated and filled with hydrogen. A 200 ml portion of toluene is added to the reactor and the reactor is flushed with hydrogen for 15 minutes with vigorous stirring. During the flushing operation a 1 gram portion (1.14 mM) of dried $CoCl(Ph_3P)_3$ catalyst is added to the solution and rapidly dissolves due to the turbulence of the stirred solution. After 15 minutes, a 1.34 gram portion (16 mM) of dried liquid 1-hexene (the olefin) is added to the stirred solution to form a reaction mixture. The flow of hydrogen is stopped and the reaction mixture is heated to 40° C. The reactor is then pressurized to 600 psig while heating and stirring continue. The course of the hydrogenation of the 1-hexene to hexane is followed by monitoring the drop in hydrogen intake as well as by periodically removing samples for gas liquid phase chromatographic analysis. After 1 hour the heating is discontinued and the hydrogenation is halted. Over 90 percent reduction to hexane is obtained.

Comparable results can be obtained when chlorotris (triphenylphosphine) iron or nickel are substituted for the cobalt complex.

EXAMPLE 2

SELECTIVE HYDROGENATION OF 1,3-CYCLOHEXADIENE TO CYCLOHEXENE USING $CoCl(Ph_3P)_3$ AS CATALYST

Using the apparatus and techniques described in Example 1, a reaction mixture comprising 1.8 ml (19 mM) of 1,3-cyclohexadiene, 200 ml toluene solvent and 1.0 g. (1.14 mM) of $CoCl(Ph_3P)_3$ is prepared using the hydrogen flushing technique described in the previous example. The diene containing reaction mixture is heated to 40° C. After 30 minutes, under a hydrogen pressure of 600 psig, a product comprising about 97.9 percent by weight of cyclohexene and 2.1 percent by weight of the fully reduced cyclohexane is obtained. Samples taken at regular intervals establish that maximum conversions to the cyclohexene are obtained within one-half hour of hydrogenation. After this initial period of selective conversion to the cyclohexene, the equilibrium of the hydrogenation apparently shifts and at the end of about 4 hours, analysis of the product mixture shows 84.6 percent by weight of cyclohexene and 15.4 percent by weight of the fully reduced cyclohexane.

EXAMPLES 3-7

REDUCTION OF OTHER DIENES BOTH OF THE CYCLIC AND LINEAR TYPE

Using the apparatus and experimental techniques of Example 1 and liquid phase gas chromatographic analysis to determine the composition of the product, hydrogenation are run under a hydrogen pressure of 600 psig, using 16 mM of the indicated diene and 1.4 mM of the $CoCl(Ph_3P)_3$ catalyst. Table I shows the products obtained and that the activity and selectivity depend on the diene substrate.

TABLE I

| Example No. | Substrate | H² pres., p.s.i.g. | Temp., °C. | Reaction time, hrs. | Products |
|---|---|---|---|---|---|
| 1 | 1,3-cyclohexadiene | 600 | 40 | 1 | 6.9% cyclohexane, 93.1% cyclohexene. |
| 2 | 1,4-cyclohexadiene | 600 | 40 | 1 | 5.6% cyclohexane, 30% cyclohexene, 64.4% 1,4-cyclohexadiene. |
| 3 | do | 600 | 25 | 23 | No reduction. |
| 4 | 1,3-butadiene | 600 | 40 | 1 | 49% butane, 46% 2-butenes, 5% 1-butene. |
| 5 | 1,5-hexadiene | 600 | 40 | 2 | 90% hexane, 10% 2-hexenes. |
| 6 | 1,3-hexadiene | 600 | 40 | 2 | 45% hexane, 55% hexenes. |
| 7 | 1,3-cyclohexadiene | 600 | 55-70 | 1 | 57% cyclohexene. |

NOTE.—No reduction at temp. 70° C., catalyst completely decomposed.

The data establishes that if 1,4- and 1,3-cyclohexadiene are typical of dienes, no hydrogenation takes place at 25° C. or below or at temperatures greater than 70° C.

EXAMPLES 8-15

HYDROGENATION OF OTHER OLEFINS WITH $CoCl(Ph_3P)_3$ CATALYST

Using the previously described procedure and analytical techniques, hydrogenations are run on the designated olefins at the reaction pressures and temperatures shown below. In all instances 16 mM of the olefin, 1.14 mM of the catalyst and 200 ml of toluene solvent are employed. Conversions are determined by glpc *gas liquid partition chromatography analysis after 1 hour and at the indicated terminating period. Table II summarizes the results obtained.

TABLE II

| Example No. | Substrate | H₂ pres., p.s.i.g. | Temp., °C. | Reaction time, hrs. | Products |
|---|---|---|---|---|---|
| 1 | 1-hexene | 10 | 40 | 1 | 13% hexane, 3.7% 2-hexenes, 83.3% 1-hexene. |
| 2 | do | 600 | 40 | 1 | 99% hexane, 1% 2-hexenes. |
| 3 | Cis-2-octene | 600 | 40 | 2 | 14.8% octane, 12.1% trans-2-octene, 73.1% cis-2-octene. |
| 4 | Trans-4-octene | 600 | 40 | 18 | 15% octane, 85% octenes. |
| 5 | 2-hexenes (84% cis, 16% trans) | 200 | 50 | 1.1 | 12% hexane, 63% cis-2-hexene, 25% trans-2-hexene. |
| 6 | do | 600 | 55 | 1.1 | 44% hexane, 27% cis-2-hexene, 29% trans-2-hexene. |
| 7 | do | 600 | 40 | 1.7 | 13% hexane, 64% cis-2-hexene, 23% trans-2-hexene. |

NOTE.—In examples 5 and 6 initial rates were good but catalyst decomposed at these temps. and complete reduction was not obtained.

As the above data indicate, if 1-hexene is typical of olefins, increased pressures give higher initial conversions.

The presence of excess triphenyl phosphine in the reaction mixture increases the thermal stability of the complex but decreases the rate of olefin reduction.

As the preceding specification, including examples, shows, the inventive process is advantageous in several respects. For instance, this invention makes available for the first time a novel group of iron triad homogeneous complexes which function well at temperatures between about 30°–40° C. as hydrogenation catalysts for the conversion of unsaturated organic molecules to their saturated derivatives. In addition, the preferred chlorotris(triphenylphosphine)cobalt(I) catalysts show especially good selectivity in the hydrogenation of diene substrates, particularly the 1,3-cyclohexadiene molecule. Further advantages are rapid and high conversions of unsaturated hydrocarbons usually within the first hour of hydrogenation, at low reaction temperatures, and at pressures between 0 to 600 psig and higher.

While the inventive process only functions well within a narrow range of reaction temperatures, in other respects it offers considerable latitude. For example, any one of several different aromatic solvents may be employed, catalysts employing different metals of the iron triad group can be used interchangeably, and the halogen atom may be selected from halogens such as chlorine and bromine without departing from the inventive concept. The metes and bounds of this invention are best determined from a perusal of the claims which follow read in light of the specification.

What is claimed is:

1. A process for hydrogenating unsaturated organic substrates consisting of carbon to carbon double bonds, said substrates being selected from the group consisting of linear aliphatic olefins, linear aliphatic dienes, cyclic aliphatic olefins and cyclic aliphatic dienes to their saturated derivatives, comprising contacting said substrate to be hydrogenated with a catalytic quantity of at least one homogeneous metal complex catalyst of the cobalt-nickel-iron triad-type of the structure:

$$MX(Ph_3Z)_3$$

wherein M is a metal selected from the triad consisting of cobalt, iron, nickel and their mixtures, Ph is an organic radical selected from the group consisting of phenoxy ($C_6H_5O$), alkylated phenoxy, phenyl, alkylated phenyl and mixtures thereof, wherein said alkylating groups contain from one to six carbon atoms, X is a halogen selected from chlorine, bromine, iodine and their mixtures, Z is a non-metallic element selected from the group consisting of phosphorus, arsenic, antimony and mixtures thereof, in a non-aqueous, substantially oxygen and carbon monoxide free environment, at temperatures below 50° C. in the presence of a hydrogen gas atmosphere at pressures ranging between 0 and 600 psig., until the desired hydrogenation takes place.

2. The process of claim 1 wherein Z is phosphorus.

3. The process of claim 2 wherein the metal is cobalt.
4. The process of claim 3 wherein X is chlorine.
5. The process of claim 1 wherein
   a. each mole of the substrate to be hydrogenated is contacted with from 0.01 to 0.1 mole of a homogeneous cobalt complex of the structure:

$$CoCl(Ph_3P)_3$$

wherein Ph is a radical selected from the group consisting of phenyl, alkylated phenyl wherein said alkylating groups contain from one to six carbon atoms, and mixtures thereof,
   b. the reaction is conducted in a medium of a solvating quantity of inert solvent in a hydrogen atmosphere, in an environment substantially free from oxygen, water and carbon monoxide, and
   c. the reaction medium is heated between about 35° to 45° C. while pressurizing with hydrogen gas at pressures ranging from 0 to 600 psig., until the desired hydrogenation of said substrate takes place, and
   d. isolating said hydrogenated product contained therein.
6. The process of claim 5 wherein the unsaturated substrate is an olefin.
7. The process of claim 5 wherein the unsaturated substrate is a diene.
8. The process of claim 7 wherein the diene is linear.
9. The process of claim 7 wherein the diene is cyclic.
10. The process of claim 5 wherein the homogeneous metal complex is $CoCl[(C_6H_5)_3P]_3$
11. The process of claim 9 wherein the unsaturated hydrocarbon is 1,3-cyclohexadiene.

* * * * *